United States Patent [19]
Fukuhara et al.

[11] 3,860,334
[45] Jan. 14, 1975

[54] IMAGE INFORMATION RETRIEVING DEVICE

[75] Inventors: Shigetomi Fukuhara, Chiba; Seiichi Hayashi, Hitachi; Chuji Tomita, Tokyo, all of Japan

[73] Assignee: Hitachi, Ltd., Tokyo, Japan

[22] Filed: June 19, 1973

[21] Appl. No.: 371,553

[30] Foreign Application Priority Data
June 19, 1972 Japan.............................. 47-60520

[52] U.S. Cl....................... 353/27, 353/66, 353/99
[51] Int. Cl.. G03b 23/10, G03b 21/08, G03b 21/28
[58] Field of Search............ 353/25, 26, 27, 67, 40, 353/41

[56] References Cited
UNITED STATES PATENTS
3,354,775   11/1967   Erbam ................................ 353/67
FOREIGN PATENTS OR APPLICATIONS
1,347,044   11/1963   France................................. 353/27
1,231,770   10/1960   France................................. 353/27

*Primary Examiner*—Samuel B. Rothberg
*Assistant Examiner*—A. J. Mirabito
*Attorney, Agent, or Firm*—Craig & Antonelli

[57] ABSTRACT

In an image information retrieving device having an optical system for retrieving desired information from among a multiplicity of information stored in information carrying units housed in a storage means, the optical system which is an important part of the device is composed of a first, a second and a third optical member, and drive means are provided for causing movement of the second optical member while maintaining a predetermined distance between it and the first optical member in response to the movement of the first optical member for tracing an image, so that the desired image can be projected always at a predetermined position and the period of time required for retrieval can be reduced.

2 Claims, 5 Drawing Figures

PATENTED JAN 14 1975

IMAGE INFORMATION RETRIEVING DEVICE

BACKGROUND OF THE INVENTION

1. Field of the Invention

This invention relates to image information retrieving devices and more particularly to an image information retrieving device of the kind which is adapted for retrieving desired information from among many information images stored in a multiplicity of information carrying units.

2. Description of the Prior Art

A shortest possible period of time required for retrieval and ease of retrieval of information are strongly demanded for image information retrieving devices. There are a structural variety of prior art image information retrieving devices which are designed for selecting a desired image from among many information images stored in information carrying units such as microfiches or holograms arranged planarly on the wall surface of a drum type or desk type storage means and projecting this selected image on the image receiving plane of an image pickup tube or on a screen so that the information can be directly viewed by the eyes of a viewer. One of the prior art image information retrieving devices has such a construction that the optical system is fixed in place and the storage is moved in a plane each time information is retrieved. In the image information retrieving device having such a construction, the weight of the storage is increased with the increase in the quantity of information resulting in the structural difficulty of causing instantaneous movement of the storage. Thus, an elongated access time is required, and therefore, a longer period of time is required for retrieval. Another prior art image information retrieving device has such a construction that the storage is fixed in place and the optical system is moved each time information is retrieved. Due to the fact that the focus of the optical system, hence the image forming position, is shifted with the movement of the optical system in the image information retrieving device having such a construction, the image pickup tube or screen disposed at this image forming position must also be moved in interlocking relation with the optical system. Therefore, this latter device has the same defect as that of the former device in that shifting of the image pickup tube having a heavy weight results in an elongated period of time required for retrieval. Further, due to the fact that the image forming position is shifted each time information is retrieved, the image cannot be simply projected on the screen for viewing of the information by the viewer.

SUMMARY OF THE INVENTION

It is an object of the present invention to provide a novel and improved image information retrieving device which can operate with a reduced access time and can thus minimize the period of time required for retrieval.

Another object of the present invention is to provide an image information retrieving device in which the focus of the optical system, hence the image forming position, is always fixed at a predetermined position and is not shifted regardless of the position of information carrying units storing information, and therefore, the image can be simply projected on the screen so that the information can be easily viewed by the viewer.

In accordance with a first feature of the present invention, an image information retrieving device for retrieving desired information from among a multiplicity of information stored in information carrying units housed in a storage means comprises an optical system composed of a first optical member, a second optical member and a third optical member, and when the first or image tracing optical member among these three optical members moves in one direction for tracing the desired image, the second optical member of light weight moves in the same direction while maintaining a predetermined distance between it and the first optical member, whereby to reduce the access time and minimize the period of time required for retrieval.

In accordance with a second feature of the present invention, the image forming position is always maintained at a predetermined position and is not moved in spite of the movement of the first optical member tracing the image, by moving the first and second optical members in a predetermined interrelation so that the image can be simply projected on the screen and the information can be easily derived from the projected image.

DESCRIPTION OF THE PREFERRED EMBODIMENTS

Figure 1:
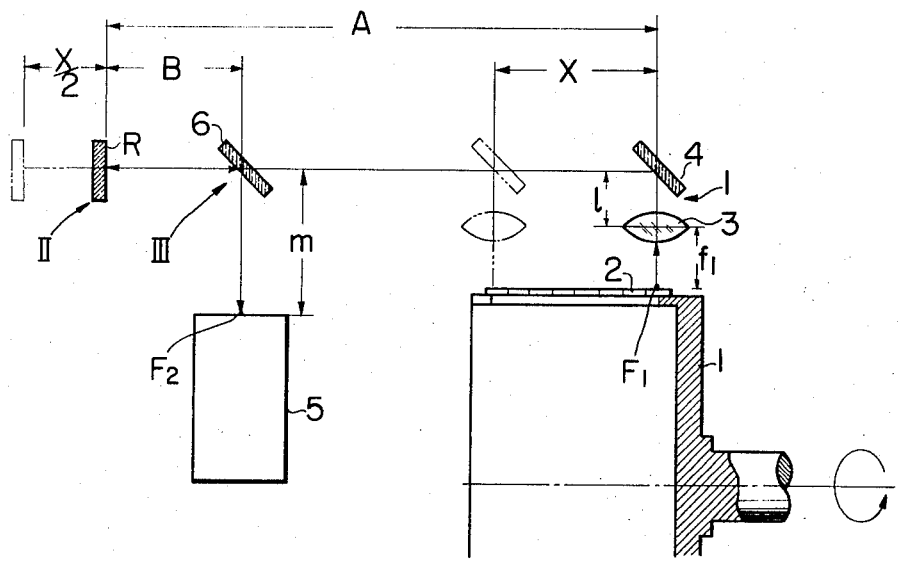
FIG. 1 is a diagrammatic view illustrating the basic principle of image information retrieval according to the present invention.
Figure 2:
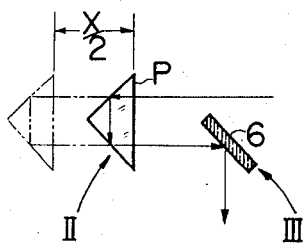
FIG. 2 shows a partial modification of the optical system shown in FIG. 1.

FIG. 1 shows diagrammatically the basic principle of image information retrieval according to the present invention. Referring to FIG. 1, a drum 1 is rotatable in a direction as shown by the arrow, and information carrying units 2 such as microfiches or holograms are detachably mounted on the outer peripheral surface of the drum 1. A convergent lens 3 has an object distance $f_1$ and an image distance $f_2$, and the optical axis of the lens 3 is perpendicular to the axis of rotation of the drum 1. The information carrying units 2 from which information are retrieved are placed at the first focus $F_1$ of the lens 3. A reflecting mirror 4 is located at such an angular position that light passing along the optical axis of the lens 3 and impinging thereagainst can be reflected in a direction perpendicular to the original direction. This reflecting mirror 4 constitutes a first optical means or member I together with the lens 3 while maintaining a predetermined distance $l$ between it and the lens 3. This first optical member I can freely move along the axis of rotation of the drum 1 with the information carrying unit 2 being always placed at the first focus $F_1$ of the lens 3. A second optical means or member II is in the form of a reflecting mirror R as shown in FIG. 1 or a prism p as shown in FIG. 2. This second optical member II is spaced by a distance A from the reflecting mirror 4 and its angular position is such that light directed from the reflecting mirror 4 can be reflected toward the mirror 4 along the same optical path. Arrangement is made so that, when the first optical member I moves to the left for example, by a distance $x$ along the axis of rotation of the drum 1, the second optical member II can also move to the left by a distance $x/2$ in interlocking relation with the first optical member I. Similarly, when the first optical member I moves to the right by a distance $x$, the second optical member II moves to the right by a distance $x/2$ in interlocking relation with the first optical member I. A third optical means or member III is located at a position spaced by a distance B from the second optical member II and may be a half mirror 6 having such a property that it allows fro transmission of light directed from the reflecting mirror 4 but it acts to reflect light from the second optical member II in another direction. When the second optical member II is in the form of a prism as shown in FIG. 2, the reflecting member 6 is preferably a reflecting mirror similar to the reflecting mirror 4. An image pickup tube 5 is located at a position spaced by a predetermined distance m from the third optical member III and its image receiving plane is positioned at the second focus $F_2$ of the lens 3.

With the above arrangement including the information carrying units 2, first optical member I, second optical member II, third optical member III and image pickup tube 5, we shall now discuss the position of the second focus $F_2$ of the lens 3 when the first optical member I is moved along the axis of rotation of the drum 1.

Since $A$ and $B$ are the length of the optical path between the first and second optical members I and II and the length of the optical path between the second and third optical members II and III respectively, the total length $D$ of the optical path from the first optical member I to the third optical member III is given by $$D = A + B \quad (1)$$

before the first optical member I is moved, and by $$D = (A-x + x/2) + (B + x/2) = A + B \quad (2)$$

after the first optical member I is moved. Consequently, the distance $L$ from the lens 3 to the image pickup tube 5 is given by $$L = l + A + B + m = f_2 \quad (3)$$

wherein $l$ and $m$ are the length of the optical path between the lens 3 and the first optical member I and the length of the optical path between the third optical member III and the face plate of the image pickup tube 5 and it will be seen that the position of the second focus $F_2$ is maintained always constant irrespective of any movement of the first optical member I along the axis of rotation of the drum 1.

Figure 3:
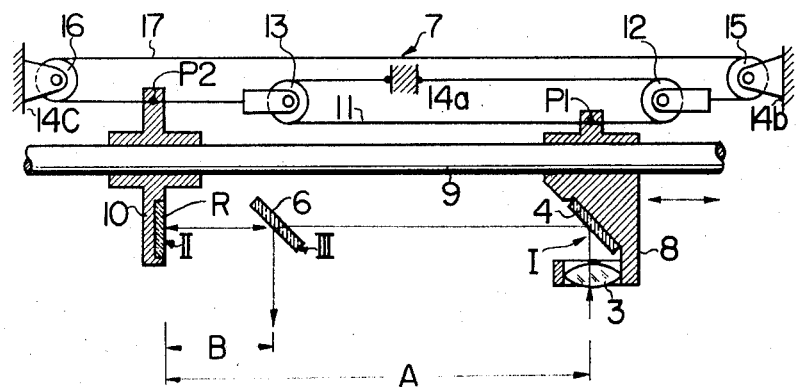
FIG. 3 is a schematic view showing the structure of an embodiment of the image information retrieving device which is based on the principle shown in FIG. 1 and includes a belt type drive means.

FIG. 3 shows an image information retrieving device which is based on the principle described with reference to FIG. 1. A belt type drive means is employed in this device and is generally designated by the reference numeral 7. Referring to FIG. 3, the first optical member I is mounted on a retrieving head 8 so that it is freely movable along a shaft 9 in directions as shown by the arrows. The second optical member II is mounted on a supporting member 10 so that it is also freely movable along the shaft 9. A first belt 11 is trained around a pair of movable pulleys 12 and 13. This first belt 11 is fixed at opposite ends thereof to a stationary member 14a and the retrieving head 8 is secured to an intermediate portion $P_1$ of the belt 11. A pair of fixed pulleys 15 and 16 are fixed to stationary members 14b and 14c respectively. A second belt 17 is trained around the fixed pulley 15 and 16, and the supporting member 10 for the second optical member II is secured to an intermediate portion $P_2$ of the belt 17. The third optical member III is secured to another stationary member (not shown) to be maintained always at a stationary position as described with reference to FIG. 1.

With such arrangement, when the first optical member I moves to the left, for example, while tracing the image with the movement of the retrieving head 8 which is driven by another drive means (not shown), the movable pulleys 12 and 13 move also to the left by a distance which is one-half of the moving distance of the first optical member I. With this movement of the first optical member I, the second optical member II moves also to the left together with the supporting member 10 and second belt 17 by a distance which is one-half of the moving distance of the first optical member I. Thus, the equations (2) and (3) described with reference to FIG. 1 are satisfied.

It will thus be seen that the position of the second focus $F_2$ of the lens 3 is immovable irrespective of any movement of the first optical member I so that the image can be projected as a clear stationary image on the image receiving plane of the image pickup tube 5 or on the screen. Further, it will be seen from FIG. 3 that the supporting member 10 can be easily manufactured to have a light weight of such an extent that only a slight force imparted to the head 8 for moving the first optical member I is enough for causing corresponding movement of the second optical member II. Thus, the optical members I and II can be substantically instantaneously moved from their stationary position thereby minimizing the access time and reducing the period of time required for retrieval.

Figure 4:
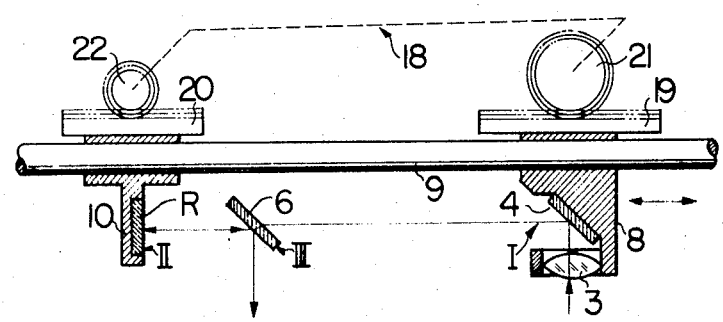
FIG. 4 is a schematic view showing the structure of another embodiment of the image information retrieving device which includes a gear type drive means.

FIG. 4 shows another image information retrieving device which is based on the principle described with reference to FIG. 1. A gear type drive means is employed in this device and is generally designated by the reference numeral 18. In FIG. 4, like reference numerals are used to denote like parts appearing in FIG. 3 and any detailed description as to these parts is unnecessary. Referring to FIG. 4, a first rack 19 and a second rack 20 are fixed to a retrieving head 8 and a supporting member 10 respectively. A first pinion 21 and a second pinion 22 are connected to each other by a common drive shaft and the gear ratio is selected to be 2 : 1. Therefore, when the first optical member I moves in one direction while tracing the image with the movement of the retrieving head 8 which is driven by another drive means (not shown), the second optical member II moves also in the same direction while satisfying the equations (2) and (3). This is easily understood from FIG. 4 and any detailed description is unnecessary.

Figure 5:
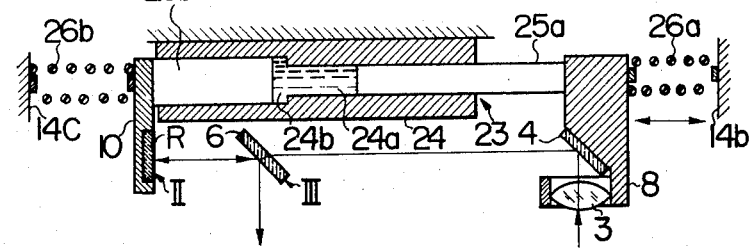
FIG. 5 is a schematic view showing the structure of a further embodiment of the image information retrieving device which includes a cylinder type drive means.

FIG. 5 shows a further image information retrieving device which is based on the principle described with reference to FIG. 1. A cylinder type drive means is employed in this device and is generally designated by the reference numeral 23. Referring to FIG. 5, a cylinder 24 comprises a first chamber 24a and a second chamber 24b, and the ratio between the internal sectional areas of these chambers 24a and 24b is selected to be 1 : 2. These chambers 24a and 24b are filled with an incompressible fluid. A first plunger 25a having a small diameter and a second plunger 25b having a large diameter extend into the cylinder 24, and a retrieving head 8 and a supporting member 10 are fixed to these plungers 25a and 25b respectively. A spring 26a is interposed between the retrieving head 8 and a stationary member 14b, and another spring 26b is interposed between the supporting member 10 and another stationary member 14c for assisting in the advancing and retracting movement of the retrieving head 8 and supporting member 10. Therefore, when the first optical member I moves in one direction while tracing the image with the movement of the retrieving head 8 which is driven by another drive means (not shown), the second optical member II moves also in the same direction while satisfying the equations (2) and (3). This is easily understood from FIG. 5 and any detailed description is unnecessary.

It will be understood from the foregoing description that the image information retrieving device according to the present invention is constructed so that, when the first or image tracing optical member among the three optical members constituting the optical system moves in one direction for tracing the desired image in response to the instruction signal, the second optical member of light weight moves in the same direction while maintaining a predetermined distance between it and the first optical member. Thus, the image information retrieving device according to the present invention is advantageous in that the access time, hence the period of time required for retrieval can be remarkably reduced.

Further, according to the image information retrieving device of the present invention, the first and second optical members are moved in a predetermined interrelation the third optical member is maintained stationary in spite of movement of the first optical member in either direction for tracing the image so that the second focus of the first optical member, hence the image forming position can be maintained always at a predetermined position. Thus, the image information retrieving device is advantageous in that the image can be simply projected on the screen and the information can be easily retrieved.

We claim:

1. An image information retrieving device comprising:
   a. a drum for supporting a film on which image information is recorded, and
   b. an optical retrieving device comprising a convergent lens moved in the direction perpendicular to the moving direction of said film for retrieving the information image recorded on said film, a first optical member being integrally mounted together with said convergent lens for reflecting an image-bearing light, a second optical member being disposed to receive the imagebearing light reflected by said first optical member and reflect it toward said first optical member, means for slidably supporting said first and second optical members, means for moving said second optical member by a given distance on said supporting means while said first optical member moves on said supporting means by twice the given distance, a third optical member disposed at a predetermined position between said first optical member and said second optical member and having a reflecting surface which is adapted to receive the image-bearing light reflected from said second optical member and reflect it in a predetermined direction, a first belt trained around a pair of movable pulleys and fixed at opposite ends thereof to stationary members, said first belt being secured at an intermediate portion thereof to said first optical member, a second belt trained around a pair of fixed pulleys mounted to stationary members and fixed at opposite ends thereof to said movable pulleys, said second belt being secured at an intermediate portion thereof to said second optical member, and drive means operatively connected to one of said fixed pulleys for driving said first and second belt.

2. An image information retrieving device comprising:
   a. a drum for supporting a film on which image information is recorded, and
   b. an optical retrieving device comprising a convergent lens moved in the direction perpendicular to the moving direction of said film for retrieving the information image recorded on said film, a first optical member being integrally mounted together with said convergent lens for reflecting an image-bearing light in one direction, a second optical member being disposed to receive the image-bearing light reflected by said first optical member and reflect it toward said first optical member, means for slidably supporting said first and second optical members, means for moving said second optical member by a given distance on said supporting means while said first optical member moves on said supporting means by twice the given distance, a third optical member disposed at a predetermined position between said first optical member and said second optical member and having a reflecting surface which is adapted to receive the image-bearing light reflected from said second optical member and reflect it in a predetermined direction, a first plunger connected to said first optical member, a second plunger connected to said second optical member, a cylinder fixed to a stationary member for accommodating said first plunger and said second plunger so as to make the axis of said first plunger coaxial with the axis of said second plunger, the ratio between the sectional areas of said first and second plungers being selected to be 1:2, means for pushing said first and second optical members respectively so as to push said first optical member toward said second optical member and to push said second optical member toward said first optical member, and drive means operatively connected to one of said optical members for moving said optical members in the direction along the axis of said plungers.

* * * * *